United States Patent
Kim et al.

(10) Patent No.: US 10,693,196 B2
(45) Date of Patent: Jun. 23, 2020

(54) POSITIVE ELECTRODE ACTIVE MATERIAL FOR SECONDARY BATTERY AND SECONDARY BATTERY INCLUDING THE SAME

(71) Applicant: LG Chem, Ltd., Seoul (KR)

(72) Inventors: Ji Hye Kim, Daejeon (KR); Young Uk Park, Daejeon (KR); Wang Mo Jung, Daejeon (KR); Sun Sik Shin, Daejeon (KR); Sang Min Park, Daejeon (KR)

(73) Assignee: LG Chem, Ltd. (KR)

( * ) Notice: Subject to any disclaimer, the term of this patent is extended or adjusted under 35 U.S.C. 154(b) by 38 days.

(21) Appl. No.: 15/547,261

(22) PCT Filed: Dec. 21, 2016

(86) PCT No.: PCT/KR2016/015056
§ 371 (c)(1),
(2) Date: Jul. 28, 2017

(87) PCT Pub. No.: WO2017/111479
PCT Pub. Date: Jun. 29, 2017

(65) Prior Publication Data
US 2018/0019504 A1    Jan. 18, 2018

(30) Foreign Application Priority Data

Dec. 23, 2015 (KR) .......... 10-2015-0184811
Dec. 20, 2016 (KR) .......... 10-2016-0174986

(51) Int. Cl.
*H01M 10/42* (2006.01)
*C01G 53/00* (2006.01)
(Continued)

(52) U.S. Cl.
CPC .......... *H01M 10/4235* (2013.01); *C01F 7/02* (2013.01); *C01F 7/021* (2013.01); *C01F 7/043* (2013.01);
(Continued)

(58) Field of Classification Search
CPC ... H01M 10/4235; H01M 4/525; H01M 4/366
See application file for complete search history.

(56) References Cited

U.S. PATENT DOCUMENTS

| 4,397,994 A | 8/1983 | Takeuchi et al. |
| 2003/0108790 A1 | 6/2003 | Manthiram et al. |

(Continued)

FOREIGN PATENT DOCUMENTS

| CN | 1685542 A | 10/2005 |
| CN | 101176226 A | 5/2008 |

(Continued)

OTHER PUBLICATIONS

Liu, L. et al., "Al2O3-coated LiCoO2 as cathode material for lithium ion batteries", Solid State Ionics, Jan. 22, 2002, vol. 153-153, pp. 341-346.

(Continued)

*Primary Examiner* — Matthew J Merkling
(74) *Attorney, Agent, or Firm* — Lerner, David, Littenberg, Krumholz & Mentlik, LLP

(57) ABSTRACT

Provided are a positive electrode active material for a secondary battery, in which, since the positive electrode active material includes a lithium-metal oxide having high-temperature stability and a metal oxide on a surface of a particle and a surface side in the particle, there is no concern about gas generation, because the occurrence of cracks on the surface of the active material is prevented during charge and discharge, and high-temperature storage stability and life characteristics may be improved when the positive (Continued)

electrode active material is used in the battery, and a secondary battery including the same.

15 Claims, 4 Drawing Sheets

(51) Int. Cl.

| | | |
|---|---|---|
| *C01F 7/04* | (2006.01) | |
| *C01F 7/02* | (2006.01) | |
| *H01M 4/36* | (2006.01) | |
| *C01G 51/00* | (2006.01) | |
| *H01M 4/525* | (2010.01) | |
| *H01M 10/0525* | (2010.01) | |
| *H01M 4/02* | (2006.01) | |

(52) U.S. Cl.
CPC ............ *C01G 51/42* (2013.01); *C01G 53/44* (2013.01); *H01M 4/364* (2013.01); *H01M 4/366* (2013.01); *H01M 4/525* (2013.01); *H01M 10/0525* (2013.01); *H01M 10/4242* (2013.01); *C01P 2002/50* (2013.01); *C01P 2002/52* (2013.01); *C01P 2002/54* (2013.01); *C01P 2004/04* (2013.01); *C01P 2004/32* (2013.01); *C01P 2004/51* (2013.01); *C01P 2004/61* (2013.01); *C01P 2004/84* (2013.01); *C01P 2006/11* (2013.01); *C01P 2006/12* (2013.01); *C01P 2006/40* (2013.01); *H01M 2004/021* (2013.01); *H01M 2004/028* (2013.01)

(56) References Cited

U.S. PATENT DOCUMENTS

| | | | |
|---|---|---|---|
| 2004/0200998 A1 | 10/2004 | Park et al. | |
| 2006/0263690 A1* | 11/2006 | Suhara | ................ C01G 51/006 429/231.3 |
| 2008/0135802 A1 | 6/2008 | Saito et al. | |
| 2010/0203388 A1* | 8/2010 | Kim | ...................... H01M 4/364 429/223 |
| 2012/0301788 A1 | 11/2012 | Kim et al. | |
| 2013/0108790 A1 | 5/2013 | Dehn et al. | |
| 2015/0228975 A1 | 8/2015 | Lee et al. | |

FOREIGN PATENT DOCUMENTS

| | | |
|---|---|---|
| CN | 101657920 B | 12/2012 |
| CN | 104282880 A | 1/2015 |
| JP | 2002151078 A | 5/2002 |
| JP | 2003221234 A | 8/2003 |
| JP | 2006216271 A | 8/2006 |
| JP | 2017103024 A | 6/2017 |
| KR | 20030083476 A | 10/2003 |
| KR | 100889622 B1 | 3/2009 |
| KR | 20120132176 A | 12/2012 |
| KR | 20120138344 A | 12/2012 |
| KR | 20150021809 A | 3/2015 |
| KR | 20150037635 A | 4/2015 |
| KR | 20150042730 A | 4/2015 |
| WO | 2004030125 A1 | 4/2004 |
| WO | 2006123711 A1 | 11/2006 |

OTHER PUBLICATIONS

Liu, L. et al., "Al2O3-coated LiCoO2 as cathode material for lithium ion batteries", Solid State Ionics, Jan. 22, 2002, vol. 152-153, pp. 341-346.

Search Report from International Application No. PCT/KR2016/015056, dated Mar. 30, 2017.

Chinese Search Report for Application No. CN 201680011047.5 dated Sep. 25, 2019, 1 page.

* cited by examiner

POSITIVE ELECTRODE ACTIVE MATERIAL FOR SECONDARY BATTERY AND SECONDARY BATTERY INCLUDING THE SAME

CROSS-REFERENCE TO RELATED APPLICATIONS

The present application is a national phase entry under § 371 of International Application No. PCT/KR2016/015056 filed Dec. 21, 2016, which claims priority from Korean Patent Application Nos. 10-2015-0184811, filed on Dec. 23, 2015, and 10-2016-0174986, filed on Dec. 20, 2016, in the Korean Intellectual Property Office, the disclosures of which are hereby incorporated herein by reference.

TECHNICAL FIELD

The present invention relates to a positive electrode active material for a secondary battery, which has excellent high-temperature stability, and a secondary battery including the same.

Background Art

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

However, lithium secondary batteries have limitations in that lifetime rapidly decreases as charge and discharge are repeated. In particular, these limitations are more serious at high temperature. The reason for this is due to a phenomenon that occurs when an electrolyte is decomposed or an active material is degraded due to moisture in the battery or other effects and internal resistance of the battery increases.

Accordingly, in order to secure high-temperature stability of the positive electrode active material, a method of coating a surface of the positive electrode active material has mainly been used. However, in a case in which a coating layer is formed by a typical method, cracks frequently occur while particles break during charge and discharge. In a case in which an uncoated surface is exposed as described above, the uncoated surface may react with an electrolyte solution injected into the lithium secondary battery to cause a battery swelling phenomenon due to gas generation in the battery.

Thus, development of a positive electrode active material, which may improve lithium secondary battery performance while addressing the above limitation, is urgently required.

DISCLOSURE OF THE INVENTION

Technical Problem

An aspect of the present invention provides a positive electrode active material for a secondary battery, which has excellent high-temperature stability, and a method of preparing the same.

Another aspect of the present invention provides a positive electrode for a secondary battery, a lithium secondary battery, a battery module, and a battery pack which include the positive electrode active material.

Technical Solution

According to an aspect of the present invention, there is provided a positive electrode active material for a secondary battery including: a core including a lithium cobalt oxide; and a lithium-metal oxide and a metal oxide, which include at least one metal selected from the group consisting of aluminum (Al), magnesium (Mg), tungsten (W), molybdenum (Mo), zirconium (Zr), titanium (Ti), tantalum (Ta), iron (Fe), vanadium (V), chromium (Cr), barium (Ba), calcium (Ca), and niobium (Nb), on a surface of the core, wherein the lithium-metal oxide is a heat fused material of the lithium cobalt oxide and the metal oxide.

According to another aspect of the present invention, there is provided a method of preparing the positive electrode active material for a secondary battery including: performing a surface treatment of lithium cobalt oxide particles with a metal-containing raw material, and sequentially performing a primary heat treatment at 200° C. to 500° C. and a secondary heat treatment at 600° C. to 1200° C.; or mixing first lithium cobalt oxide particles having an average particle diameter ($D_{50}$) of 2 μm or less and second lithium cobalt oxide particles having an average particle diameter ($D_{50}$) of 6 μm or more, and performing a heat treatment at a temperature of 600° C. or more, wherein the first lithium cobalt oxide particles; or both of the first lithium cobalt oxide particles and the second lithium cobalt oxide particles are surface-treated with the metal-containing raw material, and the metal includes at least one element selected from the group consisting of Al, Mg, W, Mo, Zr, Ti, Ta, Fe, V, Cr, Ba, Ca, and Nb.

According to another aspect of the present invention, there is provided a positive electrode for a secondary battery, a lithium secondary battery, a battery module, and a battery pack which include the above-described positive electrode active material.

Details of other embodiments of the present invention are included in the following detailed description.

Advantageous Effects

Since a positive electrode active material for a secondary battery according to the present invention includes a heat fused material of a lithium cobalt oxide and a metal raw material, which exhibits high-temperature stability, on a surface side of a particle in addition to a surface of the particle, there is no concern about gas generation, because the occurrence of cracks on the surface of the active material is prevented during charge and discharge, and high-temperature storage stability and life characteristics may be improved when the positive electrode active material is used in the battery.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
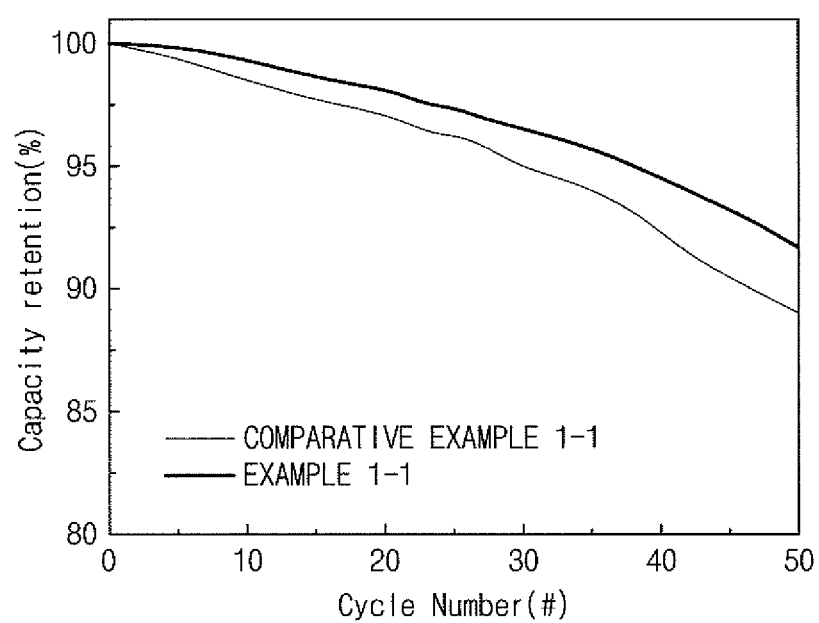
FIG. 1 illustrates evaluation results of high-temperature life characteristics of lithium secondary batteries respectively including the positive electrode active materials prepared in Example 1-1 and Comparative Example 1-1.

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A positive electrode active material for a secondary battery according to an embodiment of the present invention includes:

a core including a lithium cobalt oxide, and a lithium-metal oxide and a metal oxide, which include at least one metal selected from the group consisting of aluminum (Al), magnesium (Mg), tungsten (W), molybdenum (Mo), zirconium (Zr), titanium (Ti), tantalum (Ta), iron (Fe), vanadium (V), chromium (Cr), barium (Ba), calcium (Ca), and niobium (Nb), on a surface of the core, wherein the lithium-metal oxide is a heat fused material of the lithium cobalt oxide and the metal oxide.

As described above, since the positive electrode active material according to the embodiment of the present invention includes the lithium-metal oxide having high-temperature stability, as the heat fused material of the lithium cobalt oxide and the metal oxide, even in an inner region near the surface of the core as well as the surface of the core constituting the active material by a high-temperature sintering process during preparation, there is no concern about crack generation on surfaces of active material particles during charge and discharge, and, as a result, gas generation due to a reaction with an electrolyte solution and dissolution of the positive electrode active material in the electrolyte solution due to a reaction of the core with hydrofluoric acid derived from the electrolyte solution may be prevented by blocking a contact between the core and the electrolyte solution. Also, capacity degradation may be prevented even at high temperature due to an improvement in structural stability at high temperature, and, since tap density of the positive electrode active material is increased due to a surface treatment layer of the lithium composite metal oxide disposed on the surface of the core particle, rolling density may consequently be increased.

In the present invention, the expression 'fusion' denotes formation of physical or chemical bonding between the lithium cobalt oxide and the metal oxide at an interface therebetween, wherein an element constituting the lithium cobalt oxide and the metal oxide coexists at the interface between the lithium cobalt oxide and the metal oxide.

Specifically, in the positive electrode active material according to the embodiment of the present invention, the core includes a lithium cobalt oxide. The lithium cobalt oxide has relatively low structural stability, but has excellent life characteristics and charge and discharge efficiency.

Specifically, the lithium cobalt oxide may have a layered structure. Since the layered crystal structure may facilitate the intercalation and deintercalation of lithium during charge and discharge, capacity characteristics of the battery may be further improved.

Also, the lithium cobalt oxide may be doped with at least one doping element selected from the group consisting of Al, Mg, W, Mo, Zr, Ti, Ta, Fe, V, Cr, Ba, Ca, and Nb. In a case in which the lithium cobalt oxide is doped as described above, the structural stability of the lithium cobalt oxide may be improved by doping the lithium cobalt oxide with the above-described element without a change in the crystal structure of the lithium cobalt oxide.

Specifically, the lithium cobalt oxide may include a compound of Formula 1 below:

$$Li_{1+a}CoM^1{}_bO_2 \quad \text{[Formula 1]}$$ 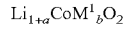

in Formula 1, $M^1$ is at least one doping element selected from the group consisting of Al, Mg, W, Mo, Zr, Ti, Ta, Fe, V, Cr, Ba, Ca, and Nb, and a and b are each independently an atomic fraction of oxide composition elements, wherein $-0.05 \leq a \leq 0.05$ and $0 \leq b \leq 0.02$.

Specifically, the lithium cobalt oxide may be a lithium-rich lithium cobalt oxide having an atomic ratio of Li/Co of 1 or more in Formula 1. In a case in which the atomic ratio of Li/Co is 1 or more, the capacity degradation may be prevented even at high temperature by improving the structural stability, particularly, high-temperature structural stability, of the active material, and the gas generation may be reduced by reducing reactivity with the electrolyte solution. Also, when a specific state of charge (SOC) is assumed in a charge and discharge process, a mechanically favorable surface may have a higher SOC and, in contrast, the inside may have a lower SOC.

A shape of the core including the lithium cobalt oxide is not particularly limited, and the core may have various shapes such as a spherical shape or an ellipsoidal shape.

Also, the core may further include open pores disposed on the surface or irregularities on the surface according to a preparation method during the preparation thereof.

For example, with respect to the formation of the irregularities on the core surface according to the preparation process, the positive electrode active material according to the embodiment of the present invention may be prepared by fusing lithium cobalt oxide particles having a fine particle size to lithium cobalt oxide particles having a large particle size by mixing and heat treating the lithium cobalt oxide particles having different particle sizes, and, in a case in which the fusion of the lithium cobalt oxide particles having a fine particle size partially occurs, the irregularities may be formed on the surface. Thus, since the irregularities are formed on the surface, a specific surface area of the core may be increased.

Specifically, the irregularities include a concave portion and a convex portion, and the concave portion may be partially or entirely buried with the above-described lithium-metal oxide and metal oxide.

The positive electrode active material for a lithium secondary battery according to the embodiment of the present invention including the above-described core includes the lithium-metal oxide having high-temperature stability and the metal oxide on the surface and a surface side of the core.

Specifically, the positive electrode active material is prepared by mixing a lithium cobalt oxide and a raw material of metal for forming the lithium composite metal oxide having high-temperature stability and then heat fusing them together by a heat treatment at high temperature, and, in this case, a metal oxide used as the raw material of the metal and lithium on the surface of the lithium cobalt oxide particle are reacted to form a heat fused material in the form of an oxide including lithium-metal and an oxide of the metal.

In this case, the lithium-metal oxide and the metal oxide thus formed may commonly include the metal included in the raw material.

The lithium-metal oxide may specifically include lithium (Li) and at least one metallic element (M) selected from the group consisting of Al, Mg, W, Mo, Zr, Ti, Ta, Fe, V, Cr, Ba, Ca, and Nb. The metallic element (M) reacts with the lithium to form the lithium-metal oxide having excellent thermal stability, and, as a result, there is no concern about crack generation on the surface of the active material particle during the charge and discharge. Specifically, the metallic element (M) may include at least one selected from the group consisting of Al, Mg, and Ti, and, for example, may be Al.

Specifically, the lithium-metal oxide may include a compound of Formula 2 below:

$$Li_m M^2 O_{(m+n)/2}$$ [Formula 2]

in Formula 2, $M^2$ is at least one element selected from the group consisting of Al, Mg, W, Mo, Zr, Ti, Ta, Fe, V, Cr, Ba, Ca, and Nb, $2 \leq m \leq 10$, and n is an oxidation number of M.

The composition of the lithium-metal oxide of Formula 2 is an average composition of the entire lithium-metal oxide formed in the active material.

Also, the metal oxide includes at least one metallic element (M) selected from the group consisting of Al, Mg, W, Mo, Zr, Ti, Ta, Fe, V, Cr, Ba, Ca, and Nb.

For example, in a case in which an aluminum oxide, such as $Al_2O_3$, is used as the metal raw material, the lithium-metal oxide of Formula 2 may be $LiAlO_2$ or $LiAlO_4$, and may include any one thereof or a mixture of two thereof. Furthermore, the metal oxide may be $Al_2O_3$ and the like.

As another example, in a case in which a tungsten oxide, such as $WO_3$, is used as the metal raw material, the lithium-metal oxide of Formula 2 may be $Li_2WO_4$, $Li_4WO_5$, or $Li_6WO_6$, and may include any one thereof or a mixture of two or more thereof. Also, the metal oxide may be $W_2O_3$ and the like.

As another example, in a case in which a boron oxide, such as $B_2O_3$, is used as the metal raw material, the lithium-metal oxide of Formula 2 may be $LiBO_2$ or $Li_2B_4O_7$, and may include any one thereof or a mixture of two thereof. Also, the metal oxide may be $B_2O_3$ and the like.

An amount of the metallic element (M) except lithium included in the lithium-metal oxide and the metal oxide may be in a range of 100 ppm to 20,000 ppm based on a total weight of the positive electrode active material. When the amount of the M is less than 100 ppm, an improvement effect due to the inclusion of the lithium-metal oxide is insignificant, and, when the amount of the M is greater than 20,000 ppm, battery characteristics may be degraded due to the excessive amount of the M.

The above-described lithium-metal oxide may be formed on the core surface along the surface of the core and on the surface side in the core inner region.

In the present invention, the expression 'surface side' of the core denotes a region near the surface excluding the surface and the center of the core. Specifically, the surface side of the core denotes a region corresponding to a distance from the core surface of 0% or more to less than 100%, particularly 0% to 50%, and more particularly 0% to 20% of a distance from the surface of the core to the center thereof, i.e., a radius of the core.

Thus, since the heat fused material of the lithium cobalt oxide and the metal oxide is disposed on the surface and the surface side of the core to strengthen the surface of the active material, battery performance may be further improved.

Also, in a case in which the lithium composite metal oxide is formed on the surface of the core, the lithium composite metal oxide may be formed to an appropriate thickness in consideration of a particle diameter of the core which determines capacity of the positive electrode active material. Specifically, the lithium composite metal oxide layer may be formed at an average thickness ratio of 0.01 to 0.1 based on the radius of the core. In a case in which the thickness ratio of the surface treatment layer is less than 0.01, the improvement effect due to the formation of the surface treatment layer may be insignificant, and, in a case in which the thickness ratio is greater than 0.1, resistant to lithium ions passing through the surface treatment layer may be increased.

In the present invention, the particle diameter of the core and the thickness of the surface treatment layer may be measured by cross-sectional analysis of the particle using a focused ion beam (FIB).

The positive electrode active material according to the embodiment of the present invention having the above-described structure and configuration may have an average particle diameter ($D_{50}$) of 2 μm to 20 μm and a Brunauer-Emmett-Teller (BET) specific surface area of 0.5 m²/g to 1.9 m²/g.

In a case in which the average particle diameter ($D_{50}$) of the positive electrode active material is less than 2 μm or the BET specific surface area is greater than 1.9 m²/g, dispersion of the positive electrode active material in the active material layer may be reduced and resistance in the electrode may be increased due to the agglomeration of the positive electrode active material, and, in a case in which the average particle diameter ($D_{50}$) is greater than 20 μm or the BET specific surface area is less than 0.5 m²/g, dispersion of the positive electrode active material itself may be reduced and the capacity may be reduced. Also, since the positive electrode active material according to the embodiment of the present invention satisfies the above-described average particle diameter and BET specific surface area conditions at the same time, excellent capacity and charge and discharge characteristics may be obtained. For example, the positive electrode active material may have an average particle diameter ($D_{50}$) of 3 μm to 15 μm and a BET specific surface area of 1.0 m²/g to 1.5 m²/g.

In the present invention, the average particle diameter ($D_{50}$) of the positive electrode active material may be defined as a particle diameter at 50% in a cumulative particle diameter distribution. In the present invention, the average particle diameter ($D_{50}$) of the core, for example, may be measured by electron microscopy using a scanning electron microscope (SEM) or field emission scanning electron microscope (FE-SEM), or using a laser diffraction method. Specifically, when measured by the laser diffraction method, particles of the positive electrode active material are dispersed in a dispersion medium, the dispersion medium is introduced into a commercial laser diffraction particle size measurement instrument (e.g., Microtrac MT 3000) and irradiated with ultrasonic waves having a frequency of about 28 kHz and an output of 60 W, and the average particle diameter ($D_{50}$) at 50% in a cumulative particle diameter distribution of the measurement instrument may then be calculated.

Also, in the present invention, the specific surface area of the positive electrode active material is measured by a BET method, wherein, specifically, the specific surface area may be calculated from a nitrogen gas adsorption amount at a liquid nitrogen temperature (77 K) using BELSORP-mini II by Bell Japan Inc.

Furthermore, the positive electrode active material according to the embodiment of the present invention may have a tap density of 1.7 g/cc or more, or 1.7 g/cc to 2.5 g/cc. The positive electrode active material of the present invention may exhibit high capacity characteristics by having high tap density within the above-described range. In the present invention, the tap density of the positive electrode active material may be measured by using a typical tap density meter, and may be specifically measured by using a powder tester manufactured by Seishin Enterprise Co., Ltd.

Also, the positive electrode active material according to the embodiment of the present invention may be prepared by various methods.

As one method, the positive electrode active material may be prepared by a method including the steps of performing a surface treatment of particles of a lithium cobalt oxide with a metal-containing raw material, and then sequentially performing a primary heat treatment at 200° C. to 500° C. and a secondary heat treatment at 600° C. to 1200° C.

The metal-containing raw material is melted by the above-described multistep heat treatment process at high temperature and then reacts with lithium present on surface and surface side of a core of the lithium cobalt oxide to form a lithium-metal oxide, as a heat fused material, and a metal oxide.

The core of the lithium cobalt oxide is the same as that previously described.

Furthermore, a metal oxide including at least one metallic element (M) selected from the group consisting of Al, Mg, W, Mo, Zr, Ti, Ta, Fe, V, Cr, Ba, Ca, and Nb may be used as the metal-containing raw material.

As another method, the positive electrode active material may be prepared by a method including the steps of mixing lithium cobalt oxide particles having different particle diameters, specifically, first lithium cobalt oxide particles having an average particle diameter ($D_{50}$) of 2 μm or less and second lithium cobalt oxide particles having an average particle diameter ($D_{50}$) of 6 μm or more, and then performing a heat treatment at a temperature of 600° C. or more. In this case, the first lithium cobalt oxide particles or both of the first lithium cobalt oxide particles and the second lithium cobalt oxide particles may be surface-treated with the metal-containing raw material.

As described above, in a case in which the lithium cobalt oxide particles having different particle diameters are used and heat-treated within the above-described temperature range, the lithium cobalt oxide particles having a smaller particle diameter, i.e., the first lithium cobalt oxide particles, are partially or completely melted to be fused to the second lithium cobalt oxide particles. In this case, a surface treatment material of the surface-treated lithium cobalt oxide particles moves to the surface and the inside of the facing particles to provide a surface treatment effect.

Specifically, the first lithium cobalt oxide particles may have an average particle diameter ($D_{50}$) of 200 nm to 500 nm, and the second lithium cobalt oxide particles may have an average particle diameter ($D_{50}$) of 6 μm to 20 μm.

Also, a surface treatment process for the first lithium cobalt oxide particles or the first and second lithium cobalt oxide particles may be performed by a typical method, and may be specifically performed by the same method as that previously described, for example, performing a surface treatment with a metal-containing raw material, and then performing a primary heat treatment at 200° C. to 500° C. and a secondary heat treatment at 600° C. to 1200° C.

Furthermore, the heat treatment may be performed at 600° C. or more, and, in a case in which the heat treatment temperature is less than 600° C., the fusion of the first lithium cobalt oxide and the subsequent formation of the lithium-metal oxide on the core surface may not be easy. Specifically, the heat treatment may be performed at 600° C. to 900° C.

According to another embodiment of the present invention, provided are a positive electrode and a lithium secondary battery which include the above-described positive electrode active material.

Specifically, the positive electrode includes a positive electrode collector and a positive electrode active material layer formed on the positive electrode collector and including the above-described positive electrode active material.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

Also, the positive electrode active material layer may include a conductive agent and a binder as well as the above-described positive electrode active material.

In this case, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt % based on a total weight of the positive electrode active material layer.

Furthermore, the binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be prepared according to a typical method of preparing a positive electrode except that the above-described positive electrode active material is used. Specifically, a composition for forming a positive electrode active material layer including the above-described positive electrode active material as well as selectively the binder and the conductive agent is coated on the positive electrode collector, and the positive electrode may then be prepared by drying and rolling the coated positive electrode collector. In this case, types and amounts of the positive electrode active material, the binder, and the conductive are the same as those previously described.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

According to another embodiment of the present invention, an electrochemical device including the positive electrode is provided. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material. The negative electrode active material layer may be prepared by coating a composition for forming a negative electrode, which selectively includes the binder and the conductive agent as well as the negative electrode active material, on the negative electrode collector and drying the coated negative electrode collector, or may be prepared by casting the composition for forming a negative electrode on a separate support and then laminating a film separated from the support on the negative electrode collector.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_x$ (0<x<2), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive agent may be the same as those previously described in the positive electrode.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles.

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle (HEV), and a plug-in hybrid electric vehicle (PHEV); or a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1-1: Preparation of Positive Electrode Active Material 0.1 part by weight of $Al_2O_3$ powder was mixed with 100 parts by weight of a core of $LiCoO_2$ (average particle diameter ($D_{50}$)=6 μm), a primary heat treatment was then performed at 200° C. for 2 hours, and a secondary heat treatment was subsequently preformed at 750° C. for 5 hours to prepare a positive electrode active material including a lithium-aluminum oxide, as a heat fused material, and an aluminum oxide on surface and surface side of the core.

Example 1-2: Preparation of Positive Electrode Active Material 0.1 part by weight of $Al_2O_3$ powder was mixed with 100 parts by weight of first lithium cobalt oxide particles (average particle diameter ($D_{50}$)=500 nm) of $LiCoO_2$, a primary heat treatment was then performed at 200° C. for 2 hours, and a secondary heat treatment was subsequently preformed at 750° C. for 5 hours to perform a surface treatment.

The surface-treated first lithium cobalt oxide was mixed with a second lithium cobalt oxide (average particle diameter ($D_{50}$)=6 μm) of $LiCoO_2$ in a weight ratio of 30:70, and a tertiary heat treatment was then performed at 950° C. for 10 hours to prepare a positive electrode active material including a lithium-aluminum oxide, as a heat fused material, and an aluminum oxide on surface and surface side of the core.

Comparative Example 1-1: Preparation of Positive Electrode Active Material 0.1 part by weight of $Al_2O_3$ powder was mixed with 100 parts by weight of a core of $LiCoO_2$ (average particle diameter ($D_{50}$)=6 μm), and a heat treatment was then performed at 200° C. for 2 hours to prepare a positive electrode active material in which a surface of the core was surface-treated with $Al_2O_3$ particles.

Comparative Example 1-2: Preparation of Positive Electrode Active Material 0.1 part by weight of $TiO_2$ was mixed with 100 parts by weight of a core of $LiNi_{0.5}Co_{0.2}Mn_{0.3}O_2$ (average particle diameter ($D_{50}$)=6 μm), and a heat treatment was then performed at 600° C. for 7 hours to prepare a positive electrode active material including a lithium-titanium oxide and a titanium oxide on a surface of the core.

With respect to the lithium nickel-based composite oxide core as Comparative Example 1-2, since a large amount of lithium-containing impurities remained on the surface of the core, the lithium-containing impurities and the metal oxide were combined on the surface of the core to form the lithium-titanium oxide and the titanium oxide on the surface of the core.

Examples 2-1 and 2-2 and Comparative Examples 2-1 and 2-2: Preparation of Lithium Secondary Batteries Lithium secondary batteries were respectively prepared by using the positive electrode active materials prepared in Examples 1-1 and 1-2 and Comparative Examples 1-1 and 1-2.

Specifically, each of the positive electrode active materials prepared in Examples 1-1 and 1-2 and Comparative Examples 1-1 and 1-2, a carbon black conductive agent, and a PVdF binder were mixed in an N-methylpyrrolidone solvent at a weight ratio of 95:2.5:2.5 to prepare a composition for forming a positive electrode (viscosity: 5,000 mPa·s), and an aluminum current collector was coated with the composition, dried at 130° C., and then rolled to prepared a positive electrode.

Also, as a negative electrode active material, natural graphite, a carbon black conductive agent, and a PVdF binder were mixed in an N-methylpyrrolidone solvent at a weight ratio of 85:10:5 to prepare a composition for forming a negative electrode, and a copper current collector was coated with the composition to prepared a negative electrode.

Each lithium secondary battery was prepared by preparing an electrode assembly by disposing a porous polyethylene separator between the positive electrode and the negative electrode prepared as described above, disposing the electrode assembly in a case, and then injecting an electrolyte solution into the case. In this case, the electrolyte solution was prepared by dissolving 1.0 M lithium hexafluorophosphate ($LiPF_6$) in an organic solvent composed of ethylene carbonate/dimethyl carbonate/ethylmethyl carbonate (mixing volume ratio of EC/DMC/EMC=3/4/3).

Experimental Example 1: Structural Observation of Positive Electrode Active Material The positive electrode active materials prepared in Example 1-1 and Comparative Example 1-1 were observed with a transmission electron microscope (TEM).

With respect to the positive electrode active material prepared in Comparative Example 1-1, a lithium aluminum oxide was formed only on the surface of a core particle. In contrast, with respect to the positive electrode active material prepared in Example 1-1, it may be confirmed that a lithium-aluminum oxide was not only formed along the surface of a core particle, but the lithium-aluminum oxide was also present to the inside of the particle.

Experimental Example 2: Evaluation of Battery Characteristics of Lithium Secondary Battery Half-cells respectively including the positive electrode active materials of Example 1-1 and Comparative Examples 1-1 and 1-2 were prepared, and cycle characteristics of each cell were evaluated by the following method.

Specifically, the half-cells (lithium negative electrode) respectively including the positive electrode active materials of Example 1-1 and Comparative Examples 1-1 were charged and discharged 50 times at a temperature of 45° C. under conditions of 1 C/2 C within a driving voltage range of 3.0 V to 4.50 V. As a result, capacity retention, as a ratio of discharge capacity in a $50^{th}$ cycle to initial capacity after the 50 cycles of charge and discharge at high temperature, was measured, and the results thereof are presented in FIG. 1.

From the experimental results, it may be confirmed that the lithium secondary battery including the positive electrode active material prepared in Example 1-1 had excellent high-temperature cycle characteristics in comparison to Comparative Example 1-1.

Figure 2:
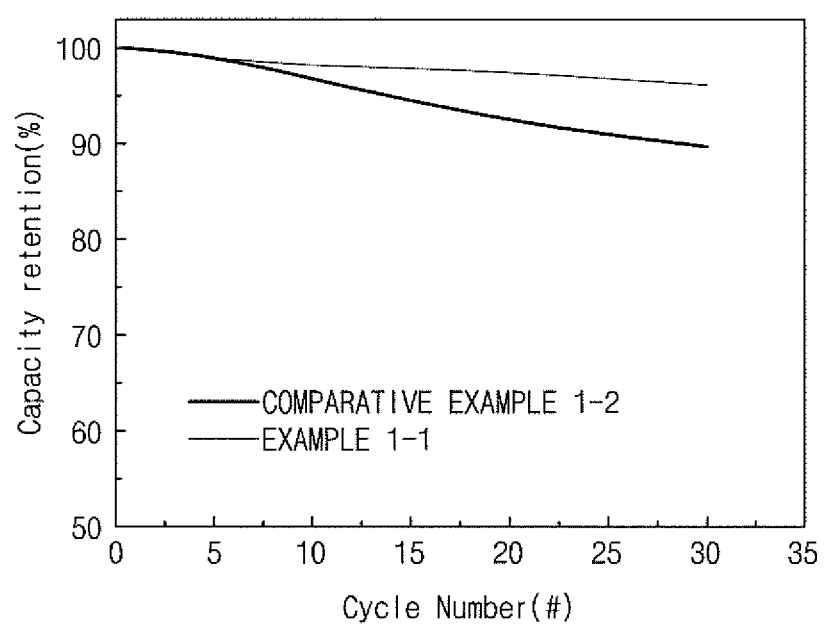
FIG. 2 illustrates evaluation results of high-temperature life characteristics of lithium secondary batteries respectively including positive electrode active materials prepared in Example 1-1 and Comparative Example 1-2.

Also, the half-cells (lithium negative electrode) respectively including the positive electrode active materials of Example 1-1 and Comparative Examples 1-2 were charged and discharged 30 times at a temperature of 45° C. under conditions of 0.5 C/1 C within a driving voltage range of 3.0 V to 4.50 V. As a result, capacity retention, as a ratio of discharge capacity in a $30^{th}$ cycle to initial capacity after the 30 cycles of charge and discharge at high temperature, was measured, and the results thereof are presented in FIG. 2.

From the experimental results, it may be confirmed that the lithium secondary battery including the positive electrode active material prepared in Example 1-1 had excellent high-temperature cycle characteristics in comparison to Comparative Example 1-2. With respect to Example 1-1, since the lithium-aluminum oxide, as a heat fused material of the lithium cobalt oxide and $Al_2O_3$, having high-temperature stability was formed even in an inner region of the core as well as the surface of the core, the high-temperature stability was further improved.

Experimental Example 3: Measurement of Gas Generation Amount of Lithium Secondary Battery Half-cells respectively including the positive electrode active materials of Example 1-1 and Comparative Examples 1-1 and 1-2 were prepared, and a gas generation amount of each cell was measured by the following method.

Figure 3:
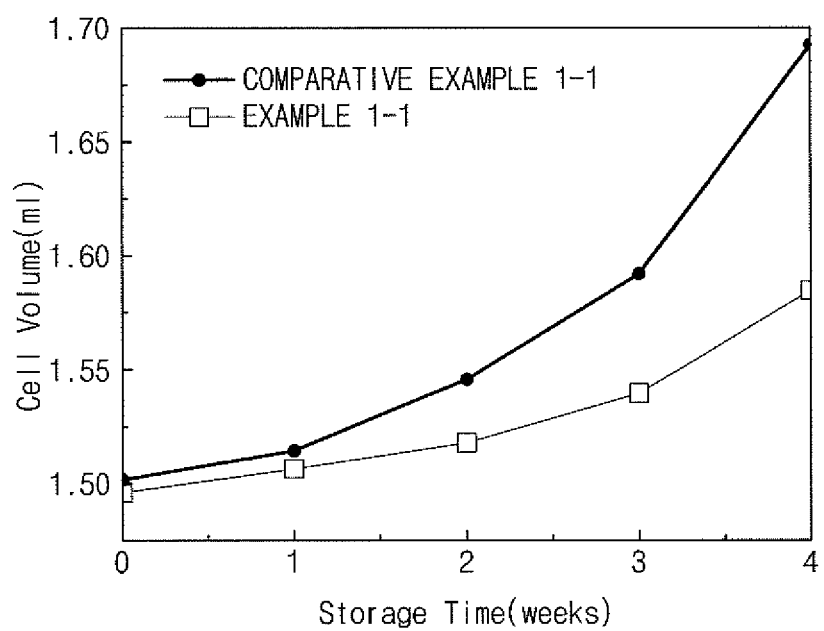
FIG. 3 illustrates evaluation results of gas generation amounts of the lithium secondary batteries respectively including the positive electrode active materials prepared in Example 1-1 and Comparative Example 1-1.

Specifically, the half-cells (lithium negative electrode) respectively including the positive electrode active materials of Example 1-1 and Comparative Examples 1-1 were charged at a constant current of 0.2 C to a voltage of 4.5 V, and then stored at 60° C. for 4 weeks to measure the generated amount of oxygen gas from changes in volume of the cell. The results thereof are presented in FIG. 3.

From the experimental results, the changes in the volume of the lithium secondary battery including the positive electrode active material of Example 1-1 was significantly lower than that of Comparative Example 1-1. Thus, it may be understood that the gas generation amount was significantly reduced.

Figure 4:
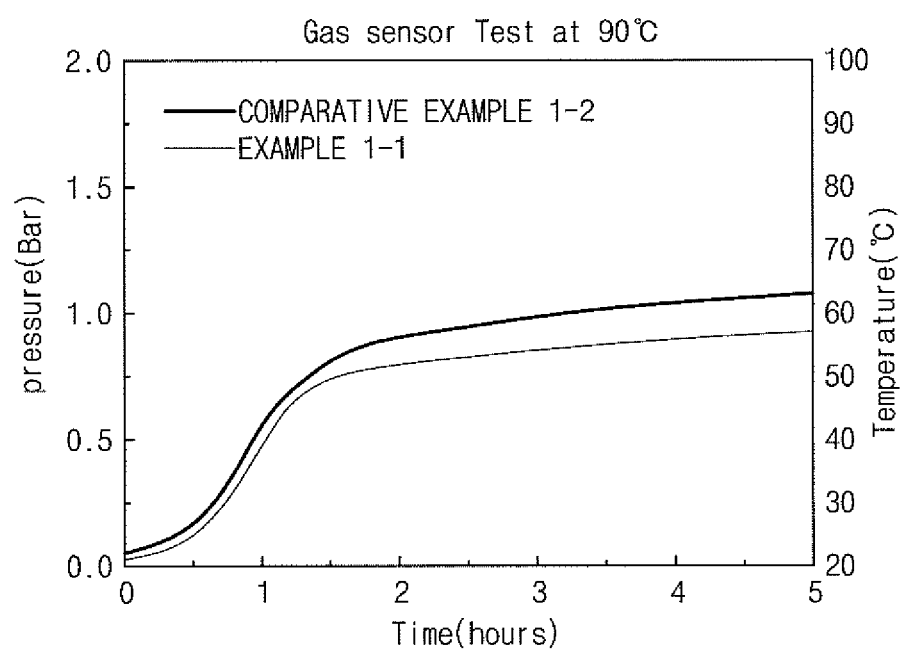
FIG. 4 illustrates evaluation results of gas generation amounts of the lithium secondary batteries respectively including the positive electrode active materials prepared in Example 1-1 and Comparative Example 1-2.

Also, the half-cells (lithium negative electrode) respectively including the positive electrode active materials of Example 1-1 and Comparative Examples 1-2 were charged at a constant current of 0.2 C to a voltage of 4.5 V, and the generated amount of oxygen gas was then measured from changes in pressure at 90° C. for 5 hours. The results thereof are presented in FIG. 4.

From the experimental results, an increase in the pressure of the lithium secondary battery including the positive electrode active material of Example 1-1 was significantly lower than that of Comparative Example 1-2. With respect to Example 1-1, since the lithium-aluminum oxide, as a heat fused material of the lithium cobalt oxide and $Al_2O_3$, having high-temperature stability was formed even in the inner region of the core as well as the surface of the core, the gas generation was significantly reduced.

The invention claimed is:

1. A positive electrode active material for a secondary battery, the positive electrode active material comprising:
    a core including a lithium cobalt oxide; and
    a lithium-metal oxide and a metal oxide, which include at least one metal selected from the group consisting of aluminum (Al), magnesium (Mg), tungsten (W), molybdenum (Mo), zirconium (Zr), titanium (Ti), tantalum (Ta), iron (Fe), vanadium (V), chromium (Cr), barium (Ba), calcium (Ca), and niobium (Nb), on a surface of the core,
    wherein the lithium-metal oxide is a heat fused material of the lithium cobalt oxide and the metal oxide, and
    wherein the core is a heat fused material of the lithium cobalt oxide particles having first lithium cobalt oxide particles having an average particle diameter of 2 μm or less and second lithium cobalt oxide particles having an average particle diameter of 6 μm or more,
    wherein the first lithium cobalt oxide particles, are melted to be fused to the second lithium cobalt oxide particles.

2. The positive electrode active material for a secondary battery of claim 1, further comprising the lithium-metal oxide and the metal oxide in a region corresponding to a distance from the surface of the core of 0% or more to less than 100% of a total distance from the surface of the core to a center thereof.

3. The positive electrode active material for a secondary battery of claim 1, wherein the lithium-metal oxide and the metal oxide comprise at least one metal selected from the group consisting of Al, Mg, and Ti.

4. The positive electrode active material for a secondary battery of claim 1, wherein the lithium-metal oxide and the metal oxide comprise Al.

5. The positive electrode active material for a secondary battery of claim 1, wherein the core comprises irregularities on the surface thereof.

6. The positive electrode active material for a secondary battery of claim 5, wherein the irregularities comprise a concave portion and a convex portion, and
    the concave portion is partially or entirely buried with the lithium-metal oxide and the metal oxide.

7. The positive electrode active material for a secondary battery of claim 1, wherein an average particle diameter ($D_{50}$) of the positive electrode active material is in a range of 2 μm to 20 μm.

8. A method of preparing the positive electrode active material for a secondary battery of claim 1, the method comprising:
    performing a surface treatment of particles of a lithium cobalt oxide with a metal-containing raw material, and sequentially performing a primary heat treatment at 200° C. to 500° C. and a secondary heat treatment at 600° C. to 1200° C.;
    the metal comprises at least one element selected from the group consisting of aluminum (Al), magnesium (Mg), tungsten (W), molybdenum (Mo), zirconium (Zr), titanium (Ti), tantalum (Ta), iron (Fe), vanadium (V), chromium (Cr), barium (Ba), calcium (Ca), and niobium (Nb).

9. A positive electrode for a secondary battery, the positive electrode comprising the positive electrode active material of claim 1.

10. A lithium secondary battery comprising the positive electrode of claim 9.

11. A battery module comprising the lithium secondary battery of claim 10 as a unit cell.

12. A battery pack comprising the battery module of claim 11.

13. The battery pack of claim 12, wherein the battery pack is used as a power source of a medium and large sized device.

14. The battery pack of claim 13, wherein the medium and large sized device is selected from the group consisting of an electric vehicle, a hybrid electric vehicle, a plug-in hybrid electric vehicle, and a power storage system.

15. A method of preparing the positive electrode active material for a secondary battery of claim 1, the method comprising:
    mixing first lithium cobalt oxide particles having an average particle diameter of 2 μm or less and second lithium cobalt oxide particles having an average particle diameter of 6 μm or more, and performing a heat treatment at a temperature of 600° C. or more,
    wherein the first lithium cobalt oxide particles; or both of the first lithium cobalt oxide particles and the second lithium cobalt oxide particles are surface-treated with a metal-containing raw material so as to form said lithium metal oxide, and
    wherein the metal-containing raw material includes a metal comprising at least one element selected from the group consisting of aluminum (Al), magnesium (Mg), tungsten (W), molybdenum (Mo), zirconium (Zr), titanium (Ti), tantalum (Ta), iron (Fe), vanadium (V), chromium (Cr), barium (Ba), calcium (Ca), and niobium (Nb).

* * * * *